Figure 1:
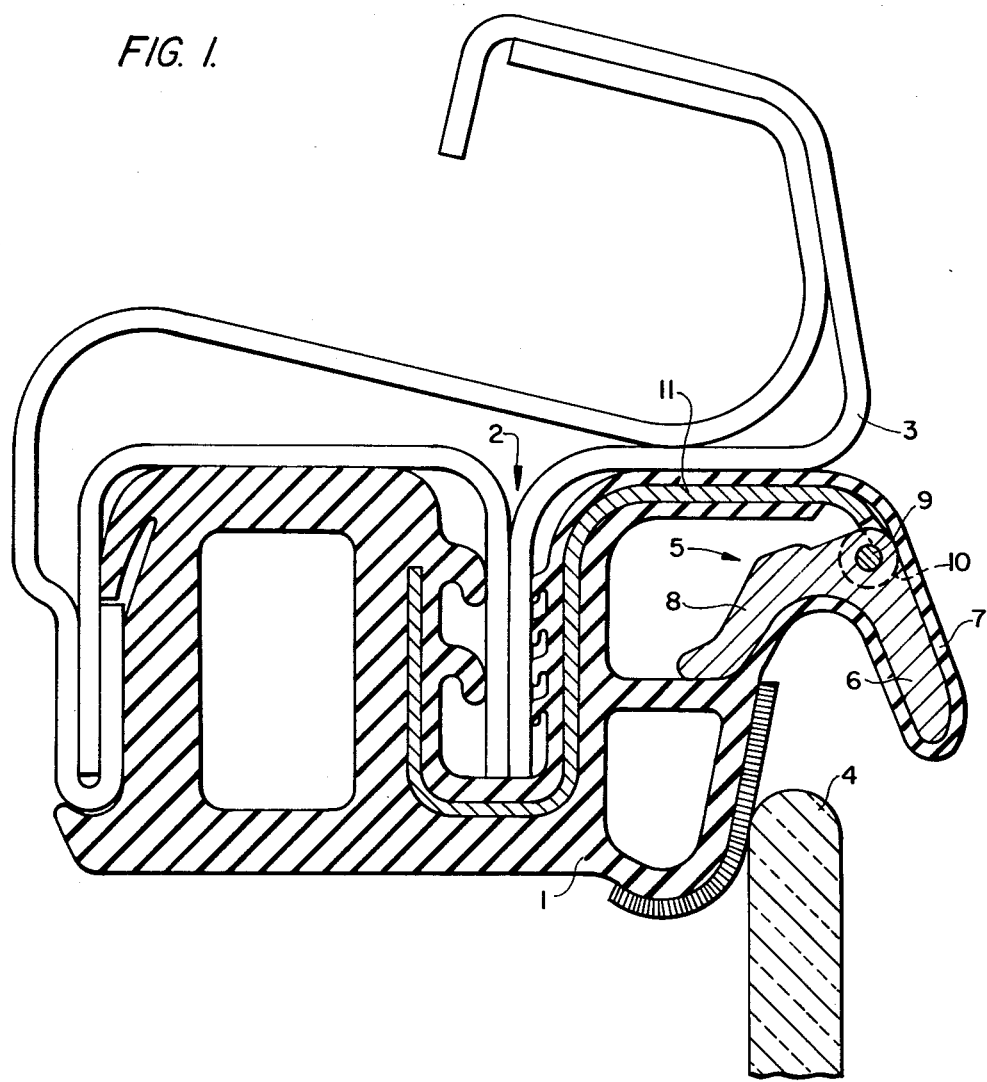

United States Patent [19]

Wahr et al.

[11] 4,455,785

[45] Jun. 26, 1984

[54] SEAL FOR LIFTABLE AND LOWERABLE WINDOWS, ESPECIALLY SIDE WINDOWS FOR PASSENGER CARS OR STATION WAGONS

[75] Inventors: Johannes Wahr, Gechingen; Guenter Kling, Böblingen, both of Fed. Rep. of Germany

[73] Assignee: Daimler-Benz Aktiengesellschaft, Stuttgart, Fed. Rep. of Germany

[21] Appl. No.: 429,676

[22] Filed: Sep. 30, 1982

[30] Foreign Application Priority Data

Oct. 21, 1981 [DE] Fed. Rep. of Germany ....... 3141729

[51] Int. Cl.³ .............................................. E06B 7/16
[52] U.S. Cl. ....................................... 49/488; 49/498
[58] Field of Search ..................... 49/488, 498, 166

[56] References Cited

U.S. PATENT DOCUMENTS

| | | | |
|---|---|---|---|
| 2,737,412 | 3/1956 | Smith et al. | 49/498 X |
| 4,047,751 | 9/1977 | Koike | 49/498 X |
| 4,370,833 | 2/1983 | Niemanns | 49/498 X |

*Primary Examiner*—Philip C. Kannan
*Attorney, Agent, or Firm*—Craig & Burns

[57] ABSTRACT

A seal for windows adapted to be lowered and raised, especially for side windows of motor vehicles, which is secured at a door or roof-frame within the area of the upper window edge and which includes a sealing lip which is displaced in the direction toward the upper outer edge area of the window when the window is raised; at least one bell crank is arranged inside the seal whose one leg extends into the sealing lip and whose other leg acts as a pivot when the window is being raised and presses the sealing lip against the window.

6 Claims, 2 Drawing Figures

SEAL FOR LIFTABLE AND LOWERABLE WINDOWS, ESPECIALLY SIDE WINDOWS FOR PASSENGER CARS OR STATION WAGONS

The present invention relates to a seal for raisable and lowerable windows; for example, side windows of passenger motor vehicles or station wagons. The side windows are secured at the door or roof frame within the area of the upper edge of the window which include a sealing lip. When the window is raised, the seal, constructed as a hollow body, deforms and is displaced in the direction toward the upper outer edge area of the window. The seal lifts itself off this upper outer edge area of the window when the window is lowered.

Such a seal is already disclosed in German Offenlegungsschrift 25 38 508. Seals of this type are used, for example, with frameless windowpanes to avoid having the windowpane drawn toward the outside by the vacuum occurring at higher driving velocities. Disadvantageously, however, the windowpane lifts off the seal and disturbing wind noises occur. Such seals, however, may also be utilized advantageously with windowpanes arranged flush with the outer edge of vehicle, which are provided with guide elements secured at their side areas that engage into set-back guide channels. In this case, the arrangement of optically disturbing guide elements would then not be necessary within the area of the upper edge of the windowpane.

The object of the present invention is to provide a seal of the aforementioned type that abuts in a secure and areal manner at the windowpane when the latter is raised and exhibits as small as possible a protrusion toward the outside of the vehicle.

The object is attained according to the present invention by providing at least one bell crank or angle lever inside the seal. One of the bell crank legs extends into the sealing lip and the other leg is acted upon by the windowpane as the window is being raised by pivoting the sealing lip toward the windowpane.

Advantageously the bell crank is pivotably supported in the seal about a shaft within the connecting area of the two legs of the bell crank.

A further advantage of the present invention is having an end portion of a support band of the seal which is formed into an eyelet or lug serve as a bearing. If the eyelet or lug is constructed as an extruded part, a simple and economical manufacture of the bell crank is possible.

Figure 2:
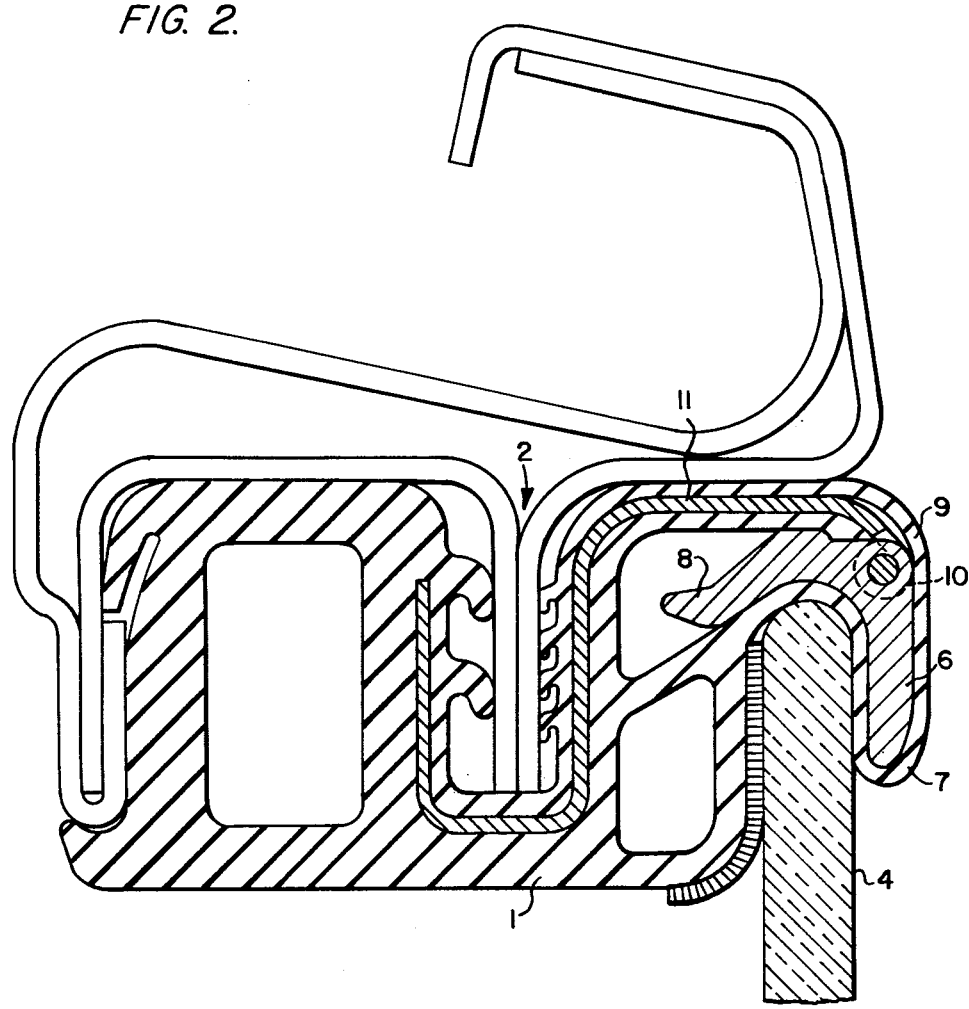

These and other objects, features and advantages of the present invention will become more apparent from the following description which when taken in connection with the accompanying drawing which shows, for purposes of illustration only, one embodiment in accordance with the present invention, and wherein:

FIG. 1 is a vertical cross sectional view through a seal arrangement in accordance with the present invention with a slightly open window, and FIG. 2 is a vertical cross sectional view, similar to FIG. 1 with a completely closed window.

Referring now to the drawing wherein like reference numerals are used throughout the two views to designate like parts, a seal 1 constructed as hollow body is mounted over a flanged area generally designated by reference numeral 2 of a window frame 3 of a motor vehicle door (not shown). The seal 1seals the upper area of a raisable and lowerable windowpane 4 which is arranged relatively far outside. A bell crank or angle lever generally designated by reference numeral 5 is arranged inside the seal 1. A first leg 6 of the bell crank 5 extends into an outwardly disposed sealing lip 7. A second leg 8 of the bell crank 5 is juxtaposed to the windowpane 4. When the windowpane 4 is raised, it acts upon the second leg 8 of the bell crank 5. The second leg 8 then presses the sealing lip 7 against the external edge area of the windowpane 4 by the pivoting movement of the bell crank 5. The bell crank 5 is pivotally supported within the area of the connection of its two legs 6 and 8 about a shaft 9. The shaft 9 is disposed on an eyelet 10. A support band or strip 11 is disposed along the uppermost edge of the seal 1. A free end of the support strip 11 is bent to form the eyelet 10. The bell crank 5 is carried by the shaft 9 which is disposed on the eyelet 10.

The bell crank 5 and the sealing lip 7 spring back when the windowpane 4 opens by the elasticity of the seal 1. The use of a leg spring or the like would also be feasible within the scope of the present invention.

Another embodiment of the present invention resides in having the bell crank supported by being embedded into the seal 1 material rather than be supported as a pivot bearing.

While we have shown and described only one embodiment in accordance with the present invention, it is understood that the same is not limited thereto, but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A seal for a window means adapted to be raised and lowered, said seal comprising:
   the seal being a hollow body,
   said seal being secured at a frame means within a flanged area of an upper edge of the window means,
   said seal being deformed during the raising of said window means,
   a sealing lip being outwardly disposed along the seal within the area of the window means,
   the sealing lip being displaced in a direction toward the upper edge of the window means during the raising of said window means,
   at least one bell crank means being pivotally carried within the seal,
   the at least one bell crank means having a first leg and a second leg,
   the first leg extending into said sealing lip,
   the second leg being in juxtaposition with the window means, whereby
   the window means, when being raised, acts upon the second leg of the bell crank, the second leg pivots the bell crank, and the bell crank presses the sealing lip against the upper edge of the window means.

2. The seal according to claim 1, further comprising a support element being disposed along the uppermost edge of the seal.

3. The seal according to claim 2, further comprising an end portion having a shaft thereon within the connecting area of the first and second legs of the bell crank means, the support element of the seal being formed into an eyelet, said eyelet serving as a bearing for said shaft.

4. The seal according to claim 3, further comprising the bell crank means being pivotally supported within said eyelet about said shaft.

5. The seal according to claim 2, further comprising the support element being a support band.

6. The seal according to claim 1, 2, 3 or 5, further comprising the bell crank means being constructed as an extruded part.

* * * * *